G. OTTO.
PESSARIES.
No. 178,458. Patented June 6, 1876.
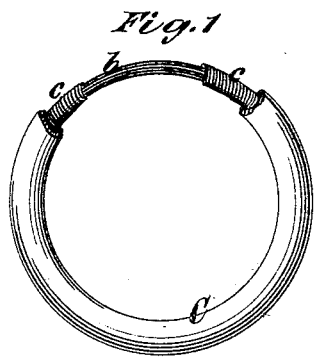
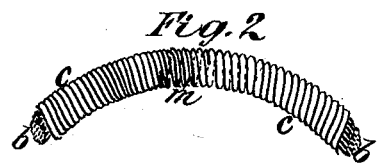
Fig.3
Witnesses:
Michael Ryan,
Fred. Haynes
Gustav Otto
by his Attorneys
Brown & Allen

UNITED STATES PATENT OFFICE.

GUSTAV OTTO, OF JERSEY CITY, NEW JERSEY.

IMPROVEMENT IN PESSARIES.

Specification forming part of Letters Patent No. 178,458, dated June 6, 1876; application filed April 7, 1876.

*To all whom it may concern:*

Be it known that I, GUSTAV OTTO, of Jersey City, in the county of Hudson and State of New Jersey, have invented an Improvement in Pessaries; and I do hereby declare that the following is a full, clear, and exact description of the same, reference being had to the accompanying drawing, which forms part of this specification.

My invention relates to elastic-ring pessaries. It has for its object to secure greater elasticity, durability, and efficiency in such pessary.

The invention consists in inclosing a spring made up of rods of whalebone, cane, or other suitable material, in the form of an annular bundle, in an annular coiled spring of wire, the ends of which are joined, so as to continuously confine the inclosed annular spring, made up of rods, as aforesaid, the whole to be subsequently covered by an elastic india-rubber coating, in the ordinary manner of coating elastic ring pessaries.

Figure 1 in the drawing represents the pessary with a portion of the elastic india-rubber coating removed and the ends of the annular coiled-wire spring separated. Fig. 2 is an enlarged detail, showing the preferred method of joining the ends of the wire spring. Fig. 3 represents a finished pessary in one of the forms in which such pessaries are frequently used.

A sufficient number of rods—preferably cylindrical rods—of whalebone are selected to be formed into an annular bundle, $b$, the rods being so placed that the ends of said rods shall not all come together at the same part of the ring, but shall be so placed as to give the bundle a nearly-uniform diameter throughout, or a single rod of whalebone wound into an annular bundle may be used. A coiled spring, $c$, the interior of which is of proper diameter to inclose the bundle of rods and to bind them in the desired form, is made, and in the interior of this spring the bundle is laid up, as before described, the coiled spring holding the rods in place as they are singly inserted. The ends of the wire spring $c$ are then twisted backward against the elasticity of the coil, and, being brought together, are released. They then interlock by screwing the coils of one into the coils of the other, and thus form a junction, as shown at $m$, Fig. 2; but other means of joining the ends of the wire spring may be used.

The india-rubber coating C may be of ordinary tubing, which may be slipped over the coiled-wire spring $c$ before placing the rods in the interior of the same.

After the ends of the spring have been joined, as described, the ends of the rubber tubing may be brought together and united in the usual way.

Great advantages, amply demonstrated by actual use in the practice of eminent physicians, are secured by this construction. The pessaries are not easily bent so as to remain permanently distorted, as is the case when the interior whalebone is bound simply with soft flexible wire. Greater elasticity and durability are attained, and the pessaries thus made act more efficiently in sustaining the womb in its normal relation to the other pelvic viscera.

I claim—

In a pessary, the combination of the interior spring $b$, made of coils of an elastic rod or rods, with the annular wire spring $c$ coiled about said spring $b$, and an exterior protecting-coating of rubber or similar impervious material, substantially as and for the purpose described.

GUSTAV OTTO.

Witnesses:
BENJ. W. HOFFMAN,
FRED. HAYNES.